(12) United States Patent
Chipchase et al.

(10) Patent No.: US 7,212,119 B2
(45) Date of Patent: May 1, 2007

(54) PROVISION OF FEEDBACK TO USERS OF COMMUNICATION DEVICES

(75) Inventors: Jan Chipchase, Tokyo (JP); Miika Antero Silfverberg, Helsinki (FI)

(73) Assignee: Nokia Corporation, Espoo (FI)

( * ) Notice: Subject to any disclaimer, the term of this patent is extended or adjusted under 35 U.S.C. 154(b) by 172 days.

(21) Appl. No.: 10/880,291

(22) Filed: Jun. 29, 2004

(65) Prior Publication Data

US 2005/0285741 A1 Dec. 29, 2005

(51) Int. Cl.
*G08B 13/14* (2006.01)
(52) U.S. Cl. .............. 340/572.1; 340/572.4; 340/539.1; 340/539.11; 340/539.23; 340/825.69; 340/825.72
(58) Field of Classification Search ........... 340/572.1, 340/572.4, 539.1, 825.69, 825.72, 686.1, 340/10.1, 10.3, 10.5, 10.51, 539.11, 539.23, 340/686.6; 455/405, 407, 557, 558, 422, 455/423, 425; 235/380, 381
See application file for complete search history.

(56) References Cited

U.S. PATENT DOCUMENTS 6,329,920 B1 * 12/2001 Morrison et al. ......... 340/573.3
6,542,083 B1 * 4/2003 Richley et al. ......... 340/825.49
6,608,551 B1 * 8/2003 Anderson et al. ......... 340/10.51

FOREIGN PATENT DOCUMENTS

WO   WO-01/50224 A2   7/2001
WO   WO-02/11074 A2   2/2004

* cited by examiner

*Primary Examiner*—Hung Nguyen
(74) *Attorney, Agent, or Firm*—Harrington & Smith, PC

(57) ABSTRACT

A pair of communication devices are capable of communication by means of a communication link, such as a Bluetooth or WLAN link. The device has an RFID tag containing data sufficient to identify feedback to be provided to a user. The device has an RFID reading device able to read feedback data from the tag. The device is operable to provide feedback, which may be audible, visible or tactile, to a user, in accordance with feedback data read by the device from the tag. Establishment of the communication link is not required before feedback can commence and thus, feedback is not delayed by the procedures required to establish the link.

30 Claims, 4 Drawing Sheets

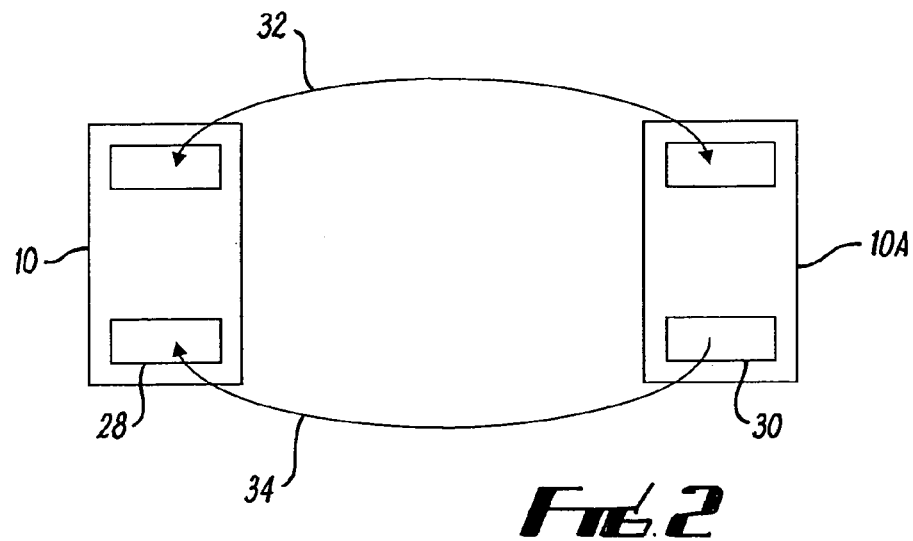
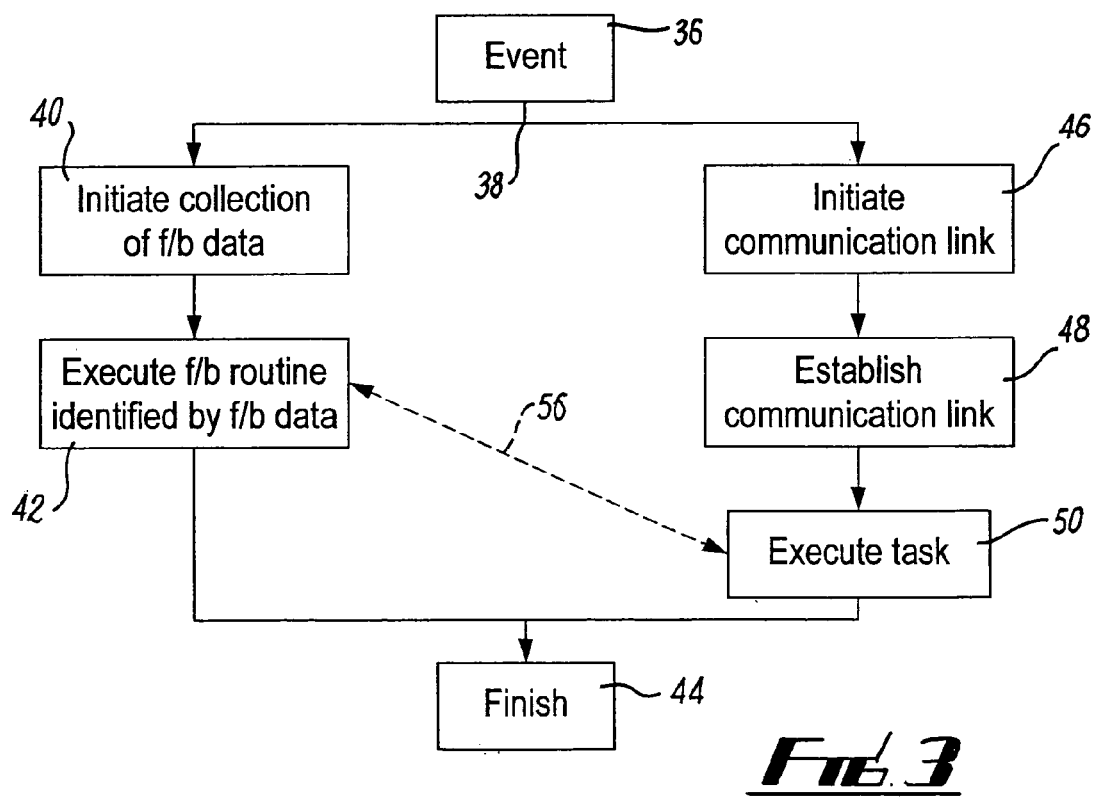

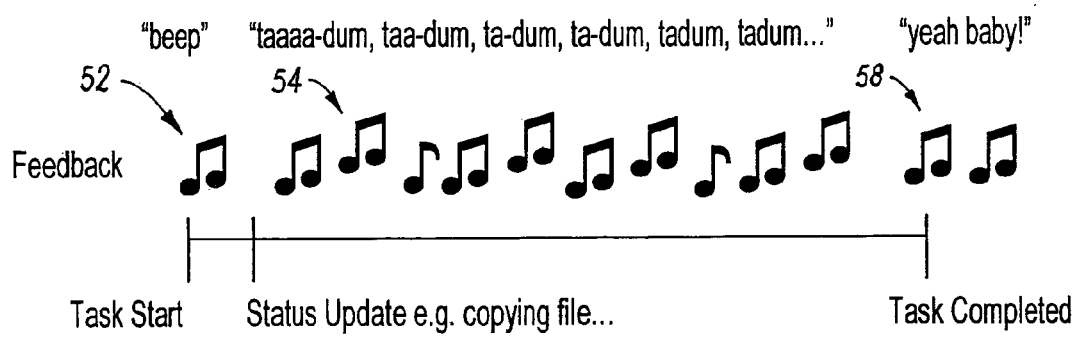

Task Start    Status Update e.g. copying file...    Task Completed

*FIG. 4*

| Parameter | Interaction |
|---|---|
| 01 | Predefined Sound 1, Vibra 1, Visual 1 |
| 02 | Predefined Sound 2, Vibra 2, Visual 2 |
| 03 | Predefined Sound 3, Vibra 3, Visual 3 |
| ... | ... |

*FIG. 5*

| Parameter | Interaction |
|---|---|
| Play these notes: "a, b, b, d-sharp, d, e" at speed = 7 at volume = 5 | According to interaction parameters |

*FIG. 6*

| Parameter | Interaction |
|---|---|
| "mysound.mpg" at volume = 3, "myimage.gif", no vibra | Play "mysound.mpg" at set parameters, show "myimage.gif" |

PROVISION OF FEEDBACK TO USERS OF COMMUNICATION DEVICES

BACKGROUND TO THE INVENTION

The present invention relates to communication devices and to the provision of feedback to users of them.

Many types of communication device are capable of communication by means of a communication link established between the devices, by means of a Bluetooth or WLAN (wireless local area network) protocol, or other link protocol. The establishment of a communication link allows devices to perform tasks such as the transfer of data files, which may contain images, music, video content, contact information or other digital content.

The performance of such digital tasks may be accompanied by the provision of feedback to device users. For example, a sound (such as a "bleep") may be used to indicate the successful completion of a task.

The present invention seeks to improve the provision of feedback to device users.

SUMMARY OF THE INVENTION

In a first aspect, the invention provides a pair of communication devices capable of communication between them by means of a communication link established between the devices;

a first of the devices having tag means associated with it and operable to contain at least data sufficient to identify feedback to be provided to a user;

a second of the devices having a reading device associated with it and able to read feedback data from the tag means of the first device, by means of a wireless channel which does not require the communication link to be used;

the second device being operable to provide feedback to a user, in accordance with feedback data read by the reading device, whereby establishment of the communication link is not required before feedback can commence.

Preferred features of this aspect of the invention are set out in the accompanying claims.

In another aspect, the invention provides a pair of communication devices, at least one of which is hand portable, the devices being capable of communication between them by means of a communication link established between the devices, a first of the devices having an RFID tag associated with it and operable to contain at least data sufficient to identify feedback to be provided to a user, a second of the devices being hand portable and having an RFID reading device associated with it and able to read feedback data from the RFID tag means of the first device, the second device being operable to provide feedback to a user, in accordance with feedback data read by the RFID reading device, whereby establishment of the communication link is not required before feedback can commence.

Preferred features of this aspect of the invention are set out in the accompanying claims.

The invention also provides a communication device capable of communication by means of a communication link established with another device, the device having a reading device associated with it and able to read feedback data from tag means associated with another device, the feedback data containing at least data sufficient to identify feedback to be provided to a user, and the device being operable to provide feedback to a user, in accordance with the feedback data read by the reading device, whereby establishment of the communication link is not required before feedback can commence.

Preferred features of this aspect of the invention are set out in the accompanying claims.

The invention also provides a communication device capable of communication with other communication devices by means of a communication link established between the devices, the device having a tag means associated with it and operable to contain at least data sufficient to identify feedback to be provided to a user, and being further operable to interact with a reader device to provide feedback data to the reader device by means of a wireless channel which does not require the communication link to be used, and the device further having a reading device able to read feedback data from a tag means associated with another device and operable to provide feedback to a user, in accordance with feedback data read by the reading device, whereby establishment of the communication link is not required before feedback can commence.

Preferred features of this aspect of the invention are set out in the accompanying claims.

The invention also provides a method of providing feedback to a user of a communication device capable of communication with another communication device by means of a communication link established between the devices, in which:

a task is initiated, the task requiring communication by means of an established communication link;

data identifying feedback to be provided to a user in relation to the task is sent from one device to the other device by means of a wireless channel which does not require a communication link to be used, and feedback is provided in response to the data being received;

whereby establishment of the communication link is not required before feedback can commence.

Preferred features of this aspect of the invention are set out in the accompanying claims.

BRIEF DESCRIPTION OF THE DRAWINGS

FIG. 2 is a simplified schematic diagram of two communication devices of FIG. 1, in use;

FIG. 3 is a simple flow diagram of the use of the devices of FIG. 2;

FIG. 4 is a schematic diagram of feedback provided in accordance with the invention;

FIGS. 5, 6 and 7 are tables illustrating various feedback data schemes;

DETAILED DESCRIPTION OF THE DRAWINGS

Figure 1:
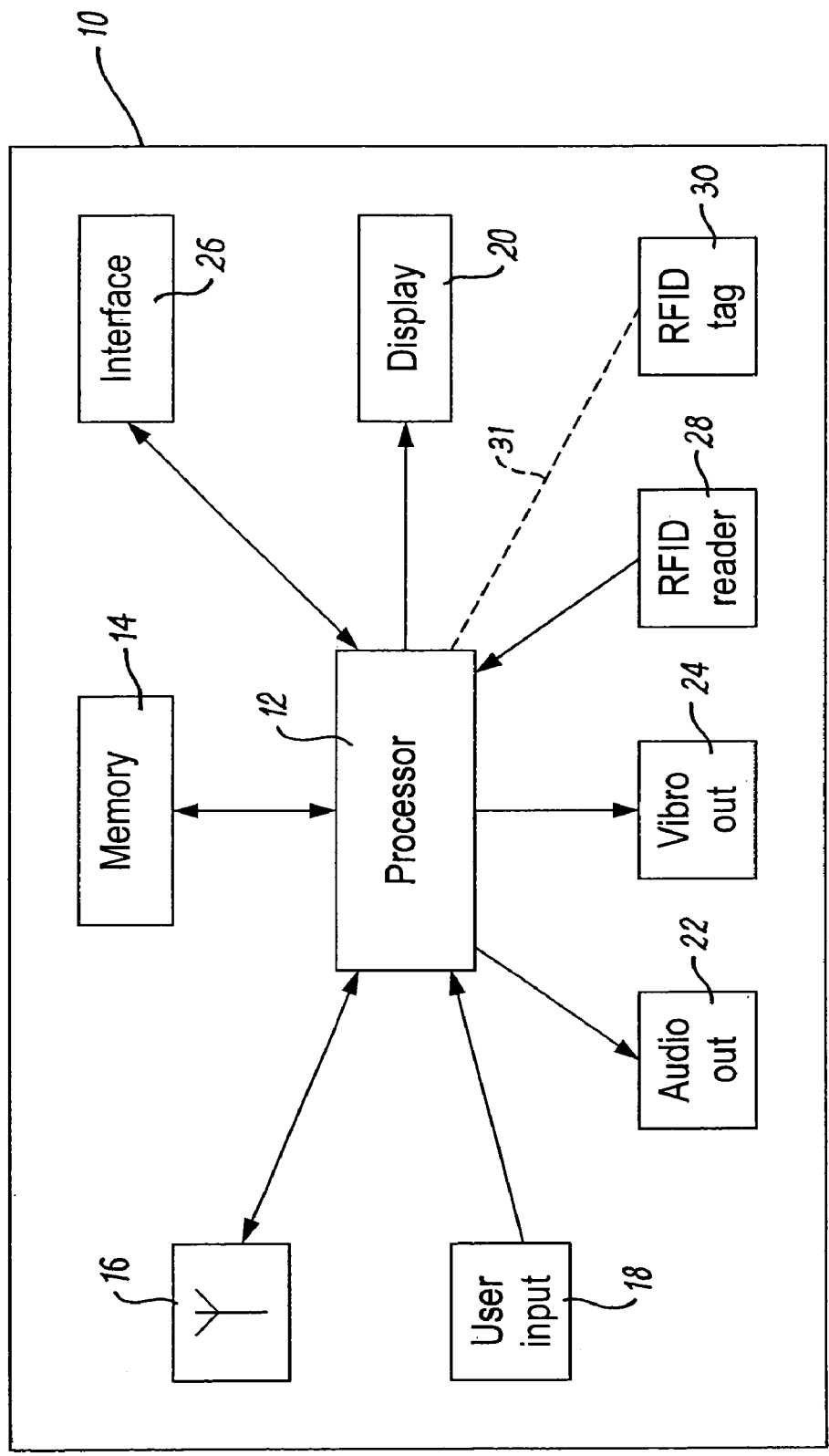
FIG. 1 is a schematic block diagram of a communication device for use in accordance with the invention.

FIG. 1 shows a communication device 10, which, in this example, is a hand portable device such as a mobile telephone or portable digital assistant (PDA), but may be another type of device, as described below. The device 10 includes a processor 12 having associated memory 14 in which software is stored which, when loaded into the processor 12, controls operation of the device 10 to performs its various functions, including those to be described, and other functions which are conventional in themselves and will not be described further. The device 10 also includes a transceiver 16 for use when the device 10 is functioning as a mobile telephone; user input devices 18, such as a keyboard, user output devices 20, such as a display, an audio output 22, such as a loudspeaker, and a transducer 24 to provide tactile output such as vibration. In this example, the device 10 also has an RFID (radio frequency identification) reader 28. The elements 14, 16, 18, 20, 22, 24, 26 are all connected with the processor 12 for communication and control purposes, as indicated in the drawing.

An interface circuit 26 is provided for use by the processor 12 to establish a communication link with another device equipped with an equivalent interface. The interface may, for example, provide a communication link according to a Bluetooth protocol, WLAN or other form of communication link.

The device 10 also includes an RFID tag 30 for containing information in a form readable by the RFID reader 28 of another similar device. The tag 30 may be connected to the processor 12 for control or communication purposes, such as to modify the data stored within the tag 30, or may be unconnected and entirely passive. The optional nature of the connection between the tag 30 and the processor 12 is indicated by a broken line 31 in FIG. 1.

In addition to radio communication through the transceiver 16, the device 10 is able to communicate over short range with a similar device by means of the interface 26. The other device may be a device as shown in FIG. 1 or may be an alternative type of device, such as a device equipped with an interface 26 but for which communication is ancillary to another function, such as printing. Since each device includes an interface 26 for establishing a communication link between devices, the devices will be called "communication devices", even if communication is not their principal purpose. Each communication device, whose use is to be described, includes either an RFID reader 28 or an RFID tag 30, but preferably includes both a reader 28 and a tag 30, in each case in addition to the interface 26.

FIG. 2 simply illustrates a device 10 interacting with another device 10A, in accordance with the invention. During this interaction, a communication link, such as a Bluetooth link or WLAN link 32 is established between the interfaces 26 of the devices 10, 10A. The communication link is bi-directional to allow handshaking routines to be implemented, for example to authenticate the device 10A to the device 10 before using the communication link 32 to complete a task such as downloading a file, image, music recording or the like. In addition to authentication, other security procedures may be required before the link 32 is used, such as to establish an encryption and decryption scheme. Successful establishment of the link 32 may also require the exchange of other information, such as to effect synchronisation between operation of the devices 10, 10A. For example, a Bluetooth link 32 would use frequency hopping techniques and would require the frequency hopping sequences of the devices 10, 10A to be synchronised.

The exchanges of information necessary to establish a communication link such as a Bluetooth or WLAN link, as just described, may require a perceptible time to be completed, such as a period of between two and four seconds.

FIG. 2 also shows a wireless channel 34 between the devices 10, 10A. The channel 34 is provided between an RFID tag 30 and an RFID reader 28. Thus, the channel 34 is uni-directional. The channel 34 exists without delay, as soon as the two devices 10, 10A come into range for the RFID devices, because an RFID channel 34 would not require authorisation or other security procedures to be executed, or for synchronisation to take place between the devices 10, 10A. Thus, no delay is experienced for establishing communication across the channel 34 and in particular, communication across the channel 34 does not require the link 32 to be established and is thus not delayed by waiting for the link 32 to be established.

The significance of the structures which have just been described can best be explained by reference to the flow chart of FIG. 3. This begins at step 36 with the occurrence of an event at the device 10 of FIG. 2. The event may be the selection of a task to be executed by means of the devices 10, 10A, such as the transfer of digital information. Examples include the transfer or exchange of data files, ring tones, images, video clips, music files or other digital data. Alternatively, the task could include the transfer or exchange of instructions, for example when the event occurs during a game being played interactively between users of the devices 10, 10A. Thus, the event 36 may be the occurrence of an instruction given by a user by means of the inputs 18 to the device 10, or an instruction created by a program running on the processor 12, such as a game.

In a further alternative, particularly applicable when only one task is available to be performed in the manner being described, the event 36 is the detection of the proximity of the RFID tag 30, indicating that another device is available for interaction. Thus, the same default task is selected each time a pair of devices come into sufficiently close proximity to establish a wireless channel between the RFID tag of one device, and the RFID reader of the other device.

In a still further alternative, the event is the detection of proximity, and the RFID tag contains data which defines the task. Preferably the RFID tag includes writeable or re-writeable memory, and the device 10A is operable by a user to set or modify the contents of the memory in order to define the task which will be performed when the device 10A interacts in the manner being described. In this manner the definition of the task becomes customisable by the user.

Upon the occurrence of an event 36, the flow chart of FIG. 3 divides at 38. A first leg of the chart begins with step 40 in which the RFID reader 28 of the device 10 is instructed to read the contents of the RFID tag 30 of the device 10A. This occurs without perceptible delay, as noted above. (It is assumed in this description that when the event 36 occurs, the proximity of the devices 10, 10A is sufficiently close to allow the communication link 32 and the wireless channel 34 to function, or alternatively, that the event 36 is the detection of this proximity, as noted above. In view of this requirement for proximity, the performance of an interaction in the manner being described may be referred to as a "proximity interaction" or as "touching" one device by the other, but it is to be understood that actual physical contact is not required).

The data contained in the tag 30 is data which identifies or defines feedback to be provided to a user during execution of the task triggered by the event 36. Thus, once the RFID reader 28 of the device 10 has read the feedback data in the tag 30 of the device 10A, the processor 12 is able to commence providing feedback to the user of the device 10. This feedback may be audible, tactile or visual, as will be described.

In the alternative in which the RFID tag contains data which defines the task, this data is read as part of step 40.

The feedback routine may be a predetermined sequence which lasts a predetermined time, or may be a more complex sequence, particularly one whose execution is dependent on progress of the task triggered by the event 36, as will be described. Completion of the feedback routine at 42 is one of the criteria resulting in completion of the interaction between the devices 10, 10A, at 44.

The second branch of the chart of FIG. 3 begins with step 46 initiating a communication link between the interfaces 26. Thus, the necessary routines are undertaken at 48 to authenticate the devices 10, 10A to each other, to meet any security protocols, including encryption and decryption schemes and to provide synchronisation between the devices 10, 10A if required, such as to synchronise frequency hopping sequences of the Bluetooth protocol. These procedures are required in order to establish the communication link 32. As noted above, the complete sequence necessary to establish the link 32 may take up to four seconds and thus would be perceptible to a user if the delay formed part of the user interaction experience.

Once the link has been established at 48, it is used at step 50 to execute the task triggered by the event 36. Successful completion of the task at 50 is the second criterion resulting in completion of the interaction at 44.

A simple feedback routine for execution at step 42 is schematically illustrated in FIG. 4. This routine includes three different feedback elements. A start element 52 is first executed and may, for example, cause a simple sound such as a "beep" to be made by the loudspeaker 22 of the device 10, this being a feedback which the user will interpret as indicating that execution of a task has been triggered. A second feedback element 54 commences after the start element 52 and continues during execution of the task (step 50). Again, this is preferably a feedback element which a user will interpret as indicating that the task is underway, such as a tune or visual display. The execution element 54 preferably continues until execution of the task (step 50) has finished and thus, it is necessary for step 42 to take into account the current status of the task being executed at step 50, this being indicated by a broken line at 56 in FIG. 3.

A third feedback element 58 is executed after the execution element 54, to indicate completion of the task at 50. Thus, the completion element 58 may be a further sound which will be interpreted by a user as completion of the task triggered by the event 36.

It can readily be understood from the above description, and particularly FIG. 3, that the provision of feedback to the user (step 42) can commence immediately the feedback data has been collected from the RFID tag. Since the RFID channel 34 is a simple channel which may be uni-directional and unsecured, the initiation of the provision of feedback at 42 is likely to be perceived by a user as instantaneously following an event 36 and in particular, the provision of the feedback at 42 is not delayed by the perceptible delay typically encountered in initiating and establishing the communication link 32 (steps 46 and 48). Thus, the experience of the user, based on the feedback provided, suggests that the task begins immediately it is triggered by the event 36 whereas in fact, an initial period is required to establish the link 32.

The feedback which is provided at 42 may be specific to the task being executed at 50, so that the feedback identifies to the user which task is underway. Alternatively, the feedback may identify a type of task and thus be generic to a group of tasks. In further alternatives, the particular feedback may depend on the identity of the devices 10, 10A or their users, so that the feedback is a form of signature, characteristic of one of the users or devices, or of the particular combination of users or devices which are interacting. The feedback data in the RFID tag 30 may be customisable by a user, by modifying the data in the tag 30, by means of the connection 31, thereby changing the feedback provided when the feedback data is transferred. This allows the feedback signature to be customised by the user.

FIGS. 5, 6 and 7 illustrate several different schemes for feedback data to be transferred at step 40. In each case, one or more parameters is listed, to be transferred from the tag 30 to the reader 28. The table indicates the corresponding feedback created, in the column headed "interaction".

FIG. 5 illustrates a scheme particularly suitable when the memory capacity of the tag 30 is limited. In this example, the tag 30 provides a single parameter from the list of alternatives in the "parameter" column. Each parameter is recognised at the device 10 as identifying a particular combination of sound, tactile and visual feedback, indicated as "Predefined Sound 1, Vibra 1, Visual 1" etc. Thus, the parameter 01 is sufficient to identify that the required feedback is the predefined actions known as Sound 1, Vibra 1 and Visual 1.

The scheme of FIG. 6 may be implemented when the memory capacity of the tag 30 is greater than is required for the scheme of FIG. 5. In this example, the parameter transferred from the tag 30 to the reader 28 is an instruction or set of instructions. In the example shown, the set of instructions is to play a particular sequence of notes at defined speed and defined volume. The receiving device 10 therefore executes these instructions to reproduce the sound sequence represented by the parameter. In the event that the sound sequence finishes before the task of step 50 is completed, the sequence is preferably repeated.

FIG. 7 illustrates an alternative scheme requiring still further memory capacity in the tag 30, sufficient to store complete audio files and images (in this case called, respectively, mysound.mpg and myimage.gif). In this example, the parameters transferred from the tag 30 to the reader 28 as feedback data are the complete file mysound.mpg and myimage.gif, together with an instruction to reproduce the audio file mysound.mpg at volume level 3, and the instruction "no vibra" indicating that no tactile feedback is required. The files and instructions are used at the receiving device 10 to recreate the corresponding feedback for the user of the device.

Figure 8:
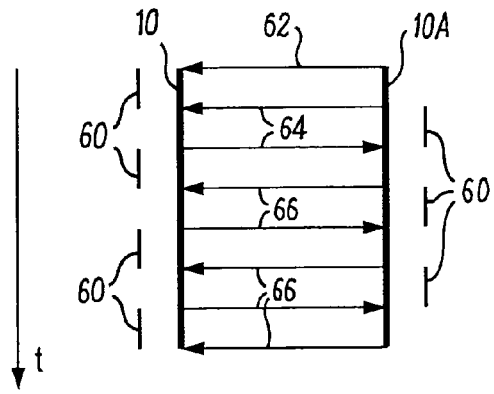
FIG. 8 is a diagram illustrating feedback provided by cooperation between two communication devices.

In all of the above examples, feedback for the user has been provided solely by the receiving device 10. In some circumstances, the feedback for the user of one or both devices 10, 10A may be further enhanced by requiring both devices to participate in the provision of feedback, when the devices are interacting. This provides a user experience which represents the two devices cooperating to complete the task. This is illustrated schematically in FIGS. 8 and 9. FIG. 8 represents the two devices 10, 10A as vertical, solid lines. Horizontal arrows between the devices 10, 10A represent communication between the devices. Vertical bars 60, to either side of the devices 10, 10A illustrate periods of feedback created by the corresponding device 10, 10A. In relation to the bars 60 and horizontal arrows, the diagram of FIG. 8 represents a time chart, with time running vertically from the top of FIG. 8 towards the bottom.

The first communication to occur between the devices 10, 10A is the transfer at 62 of feedback data from the RFID tag 30 of the device 10A, to the RFID reader 28 of the device 10. Receipt of this data immediately commences a feedback sequence represented by the bars 60. Synchronisation requirements for this sequence are described more fully below. It can be seen from FIG. 8 that the bars 60 alternate between the devices 10, 10A. Thus, each bar 60 represents a feedback element provided at the corresponding device, and thus represents an element of the user experience relating to the interaction. It can be seen that these elements alternate between the two devices.

Other arrows 64 illustrate the establishment of the communication link 32, which may take several steps and last for a time which is long enough to be perceptible to a user, as noted above. However, the establishment of the communication link 32 does not form part of the user experience, because the provision of user experience feedback 60 is not affected by it, or by any delays associated with it. Once the link 32 is established, further communication takes place at 66, to complete the task. During this time, as can be seen, the sequence of feedback bars 60 is alternately creating feedback elements from the two devices 10, 10A. The result is shown in a different schematic form in FIG. 9, in which the feedback provided by the devices 10, 10A are respective horizontal lines 70A, 70B. It can also be seen from FIG. 9 that, similar to the scheme of FIG. 4, the feedback is divided into a start element 52A, an execution element 54A and a completion element 58A, but each element is composed of several constituent elements alternately performed by the two devices 10, 10A. Thus, the start element 52A is a "beep" issued by the device 10, followed by a "beep" issued by the device 10A. The execution element 54A is a tune made of short segments alternately played by the devices 10, 10A. The completion element 58A is again a composite sound made up of two sounds, one performed by each of the devices 10, 10A.

FIG. 8 may suggest that each subsidiary element performed by the devices 10, 10A must be of equal length, but other sequences could readily be envisaged and used.

Figure 9:
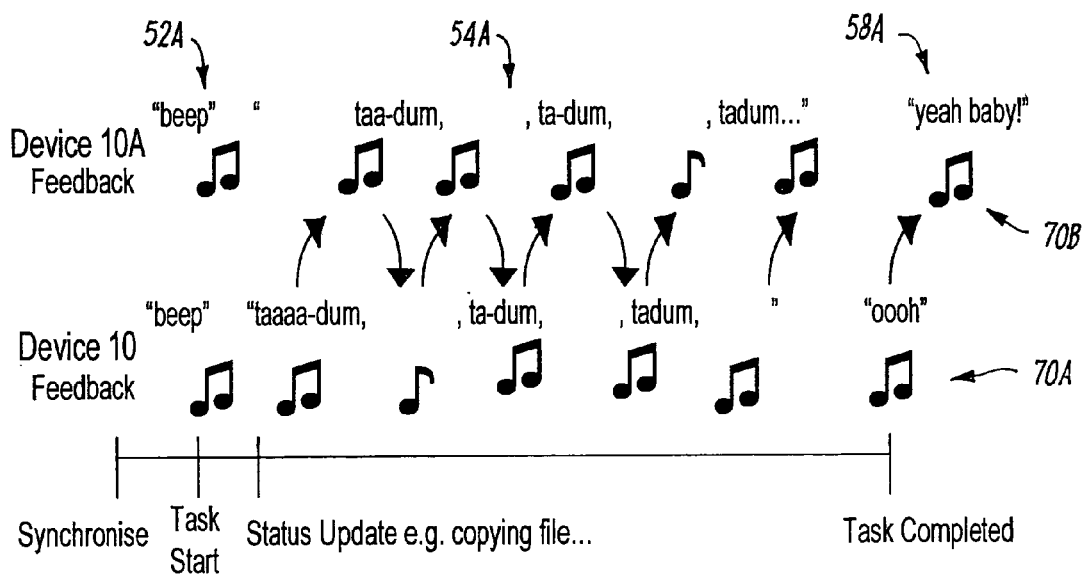
FIG. 9 corresponds with FIG. 4, illustrating the feedback provided in accordance with the diagram of FIG. 8.

It is envisaged that the scheme of FIG. 9 will require synchronisation of timing within the devices 10, 10A. This may be achieved by including some time synchronisation or timebase information in the feedback data provided from the tag 30 to the reader 28, in which case, it is envisaged that it will be necessary for the device 10A to be able to detect that the tag 30 is being read, and to be able to write data to the tag 30, so that the necessary time information can be included in the feedback data which is transferred. Alternatively, if it is not possible to set up synchronisation by means of the RFID channel 34, this synchronisation will be set up as part of the establishment of the communication link 32. However, this is the only part of establishment of the link 32 required in order to begin the feedback scheme of FIG. 9. It is not necessary for the complete establishment of the link 32 to be achieved, before feedback can begin. Again, therefore, it is envisaged that the user can be provided with feedback immediately, or almost immediately the occurrence of the event 36 triggers the task, and in particular, that the start of feedback is not delayed until the link 32 is fully established.

The described arrangements enable a user, while performing a task with another user, to enjoy a personalised and satisfying user experience which is not interrupted or delayed by those aspects of performance of the task which are not experienced by the user. This is achieved in the described arrangements by the speedy provision of the user experience feedback data, once the task is triggered, to mask any delay in establishing the link 32. The result is an interaction experience which does not appear to include any dead time or delay during the performance of the task. The arrangements are thus able to provide an enhanced experience to a user, arising from the performance of the task.

Many different types of device could be used, particularly including hand portable, but also including fixed devices such as printers, desk-top computers, network servers etc. It is particularly preferred that all devices have a reader and a tag, so that feedback can be provided by either device or by both devices, but it is sufficient for one of the interacting devices to include a tag, and the other to include a reader. Thus, in a population of devices which includes devices with a tag only, devices with a reader only, and devices with both, many pairings of devices will be able to perform as described above.

We claim:

1. A pair of communication devices capable of communication between them by means of a communication link established between the devices;
    a first of the devices having tag means associated with it and operable to contain at least data sufficient to identify feedback to be provided to a user;
    a second of the devices having a reading device associated with it and able to read feedback data from the tag means of the first device, by means of a wireless channel which does not require the communication link to be used;
    the second device being operable to provide feedback to a user, in accordance with feedback data read by the reading device, whereby establishment of the communication link is not required before feedback can commence.

2. A pair of devices according to claim 1, wherein the tag means is a passive device.

3. A pair of devices according to claim 1, wherein the tag and reading device are RFID devices.

4. A pair of devices according to claim 1, wherein at least the second device is hand portable.

5. A pair of devices according to claim 1, wherein both devices are hand portable.

6. A pair of devices according to claim 1, wherein both devices have an associated tag means and an associated reader.

7. A pair of devices according to claim 1, wherein both devices participate, in use, in the provision of feedback, when the devices are interacting.

8. A pair of devices according to claim 7, wherein operation of the devices is coordinated, in use, to provide a predetermined sequence of feedback actions of the two devices.

9. A pair of devices according to claim 8, wherein the devices act alternately to create the sequence.

10. A pair of devices according to claim 1, wherein the feedback includes one or more of sound, vibration and visual feedback.

11. A pair of devices according to claim 1, wherein the feedback data identifies an instruction or set of instructions stored at the second device, and which the second device is able to execute to provide feedback to the user.

12. A pair of devices according to claim 1, wherein the feedback data contained in the tag means includes an instruction or set of instructions which the second device is able to execute to provide feedback to the user.

13. A pair of devices according to claim 1, wherein the feedback identified by the feedback data preferably includes at least one of:
    (i) a feedback element identifiable to represent the beginning of an interaction;
    (ii) a feedback element identifiable to represent an interaction which is in progress; and
    (iii) a feedback element identifiable to represent the completion of an interaction.

14. A pair of devices according to claim 1, wherein the feedback data is sufficient to identify feedback to be provided in conjunction with an identified corresponding task or type of task to be performed by means of the communication link.

15. A pair of devices according to claim 1, wherein the first of the devices is user operable to set the feedback data, whereby to set the feedback identified by the feedback data.

16. A pair of communication devices, at least one of which is hand portable, the devices being capable of communication between them by means of a communication link established between the devices, a first of the devices having an RFID tag associated with it and operable to contain at least data sufficient to identify feedback to be provided to a user, a second of the devices having an RFID reading device associated with it and able to read feedback data from the RFID tag means of the first device, the second device being operable to provide feedback to a user, in accordance with feedback data read by the RFID reading device, whereby establishment of the communication link is not required before feedback can commence.

17. A communication device capable of communication by means of a communication link established with another device, the device having a reading device associated with it and able to read feedback data from tag means associated with another device, the feedback data containing at least data sufficient to identify feedback to be provided to a user, and the device being operable to provide feedback to a user, in accordance with the feedback data read by the reading device, whereby establishment of the communication link is not required before feedback can commence.

18. A communication device capable of communication with other communication devices by means of a communication link established between the devices, the device having a tag means associated with it and operable to contain at least data sufficient to identify feedback to be provided to a user, and being further operable to interact with a reader device to provide feedback data to the reader device by means of a wireless channel which does not require the communication link to be used, whereby establishment of the communication link is not required before feedback can commence.

19. A communication device capable of communication with other communication devices by means of a communication link established between the devices, the device having a tag means associated with it and operable to contain at least data sufficient to identify feedback to be provided to a user, and being further operable to interact with a reader device to provide feedback data to the reader device by means of a wireless channel which does not require the communication link to be used, and the device further having a reading device able to read feedback data from a tag means associated with another device and operable to provide feedback to a user, in accordance with feedback data read by the reading device, whereby establishment of the communication link is not required before feedback can commence.

20. A method of providing feedback to a user of a communication device capable of communication with another communication device by means of a communication link established between the devices, in which:
   a task is initiated, the task requiring communication by means of an established communication link;
   data identifying feedback to be provided to a user in relation to the task is sent from one device to the other device by means of a wireless channel that does not require a communication link to be used, and feedback is provided in response to the data being received;
   whereby establishment of the communication link is not required before feedback can commence.

21. A method according to claim 20, wherein sending feedback data is initiated when the task is initiated.

22. A method according to claim 20, wherein sending feedback data is initiated before the communication link is established.

23. A method according to claim 20, wherein feedback data is retrieved from a passive device associated with the another communication device with which a communication link is being established.

24. A method according to claims 20, wherein feedback data is retrieved by means of an RFID tag and reader device.

25. A method according to claim 20, wherein both devices participate in the provision of feedback, when the devices are interacting.

26. A method according to claim 25, wherein operation of the devices is coordinated to provide a predetermined sequence of feedback actions of the two devices.

27. A method according to claim 26, wherein the devices act alternately to create the sequence.

28. A method according to claim 20, wherein the feedback includes one or more of sound, vibration and visual feedback.

29. A method according to claim 20, wherein the feedback identified by the feedback data includes at least one of:
   (i) a feedback element identifiable to represent the beginning of an interaction;
   (ii) a feedback element identifiable to represent an interaction which is in progress; and
   (iii) a feedback element identifiable to represent the completion of an interaction.

30. A method according to claim 20, wherein the feedback data is sufficient to identify feedback to be provided in conjunction with an identified corresponding task or type of task to be performed by means of the communication link.

* * * * *